United States Patent Office 3,767,757
Patented Oct. 23, 1973

3,767,757
METHOD OF POLYMER FABRICATION UNDER HYDROSTATIC PRESSURE
Walter Irving Vroom, South Plainfield, and Robert Franklin Westover, Princeton, N.J., assignors to Bell Telephone Laboratories, Incorporated, Murray Hill, N.J.
Continuation of abandoned application Ser. No. 25,047, Apr. 2, 1970. This application Mar. 13, 1972, Ser. No. 234,027
Int. Cl. B29c 17/02
U.S. Cl. 264—291
9 Claims

ABSTRACT OF THE DISCLOSURE

The production of many articles made from polymeric materials can be economically performed by mechanical cold forming operations. It is disclosed here that for many polymeric materials these operations can be facilitated by the application of hydrostatic pressure, typically in the 5,000 to 15,000 pound per square inch range. This is due to the discovery that, while under pressure, each of these polymeric materials possesses a ductility peak as great as a factor of five.

CROSS REFERENCE TO RELATED APPLICATION

This application is a continuation of our copending application, Ser. No. 25,047, filed Apr. 2, 1970, and now abandoned.

BACKGROUND OF THE INVENTION (1) Field of the invention

This invention concerns the mechanical forming of polymeric materials.

(2) Description of the prior art

Commercially important polymeric materials can be classified in various ways. A few are the polymerized product of a single monomer. However, more frequently these bodies are copolymers of more than one monomer or blends of polymers and/or copolymers. The physical structure of these materials also varies widely depending upon the details of their preparation. These bodies vary from an almost totally amorphous to an almost total crystalline structure. Most commercially important materials lie away from the extremes of this range and can be considered as being constituted of a mixture of amorphous and crystalline regions. The crystalline regions for most purposes can be considered ideally elastic regions of relatively high elastic modulus and not readily subject to flow. The amorphous regions which lie between the crystallites may also be quite rigid if the temperature is below the amorphous "brittle" point for that material. On the other hand if the temperature is above the brittle point, these amorphous regions are much more easily deformable. A standard test for the ductility of these materials (American Society for the Testing of Materials, bulletin D638-67T) consists of taking a standard dumbbell shaped sample of the polymer in question and drawing the ends apart in a suitable testing machine until the sample fails. The elongation-at-break is a measure of the ductility of the polymer.

This type of test is directly related to several commercially important mechanical forming procedures. Many desired shapes can be economically made by starting with sheet or bar stock polymers and cold forming them. There are at least two important limitations of this cold forming process. First the material may actually fail before the desired degree of extension is reached. Second, the material may exhibit the undesirable phenomenon known as "whitening" which is a descriptive term stemming from the change in appearance of these materials caused by microcracks which are produced in the polymer body by the tensile stress.

Some studies of the mechanical properties of metals looked into the effect of hydrostatic pressure on ductility. It has been found that some metals, particularly very fine-grained samples of these metals, when subject to large hydrostatic pressures exhibit a phenomenon which has been named superplasticity. These metals have shown monotonic increase in ductility when subject to large hydrostatic pressures up to the highest attainable pressures of 100,000 pounds per square inch where some have withstood elongations hundreds of times greater than the elongations they could withstand at atmospheric pressure, before failing. A similar experiment tried using polystyrene in an oil pressure medium (Nature, 202 [1964], p. 381) showed that polystyrene subject to a hydrostatic pressure of the order of 100,000 pounds per square inch was indeed more ductile than polystyrene at atmospheric pressure. However, this was subsequently shown to be misleading. Later experiments using mercury as a non-interacting pressure medium showed that polystyrene becomes monotonically less ductile as the hydrostatic pressure is increased. In the prior experiment, the oil had probably penetrated the polymer and acted as a plasticizer.

SUMMARY OF THE INVENTION

The invention disclosed here lies in the discovery that polymeric bodies in an intermediate ductility range exhibit a *ductility peak* while subject to moderate hydrostatic pressures. It has been found, using a nonpenetrating fluid as a pressure medium, that materials which possess a degree of ductility producing an elongation-at-break in a range generally between 5 percent and 150 percent at room temperature, show an increase in ductility (observed to be as great as a factor of 5) while subject to hydrostatic pressures, typically, in the neighborhood of 5,000 to 15,000 pounds per square inch. This is in contrast to the behavior of materials exhibiting ductilities both below and above this range when tested by the standard atmospheric pressure test. Materials both below and above this ductility range become less ductile as the hydrostatic pressure is increased. Utilizing this phenomenon, polymeric bodies in the favorable ductility range can be cold formed to a much greater degree while subject to hydrostatic pressure in the neighborhood of the ductility peak for that material.

DETAILED DESCRIPTION OF THE INVENTION

Figure 1:
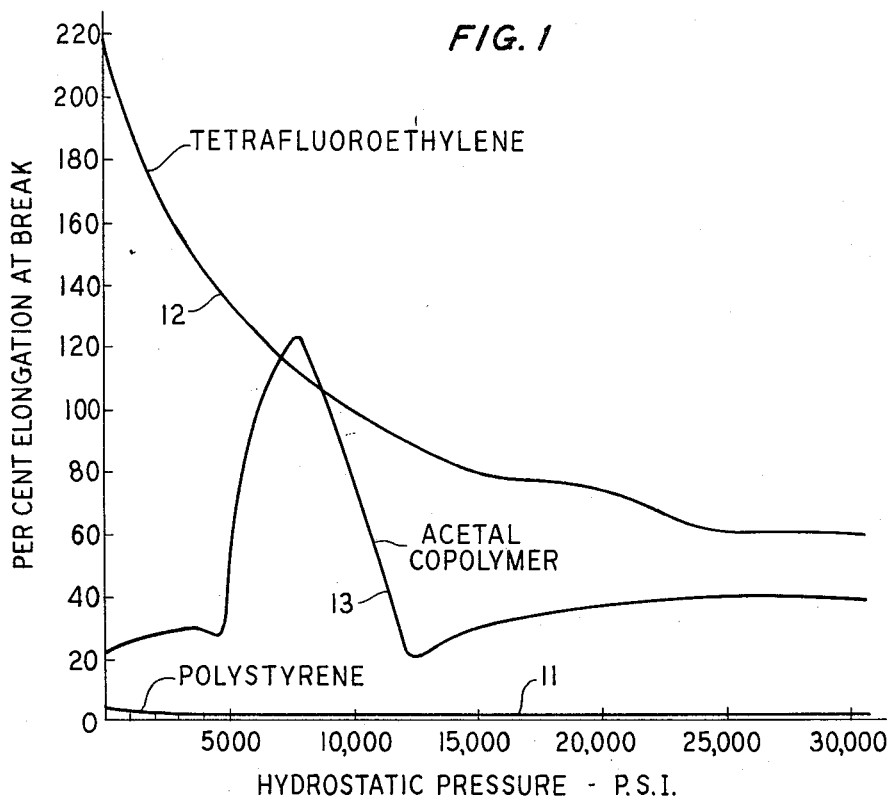
FIG. 1 is a set of curves showing extension-at-break (ordinate) versus hydrostatic pressure (abscissa) characteristic of three polymeric materials representative of the three disclosed ductility ranges.

In FIG. 1 the ductility characteristics of three materials which are representative of the three discovered polymer behavior classes are shown as a function of applied hydrostatic pressure. The measurements represented by these curves were made using an apparatus, such as that represented in FIG. 2, in which a standard dumbbell shaped sample 21 is extended by extensional forces 22 while the sample 21 is subject to a hydrostatic pressure 23 transmitted to the sample 21 by the surrounding fluid medium 24 (for standard sample and grip geometries see ASTM Bulletin D*38–67T, FIGS. 1, 2 and 3). The measure of ductility of the sample 21 is the extension-at-break. This quantity is calculated as in ASTM Bulletin D638-67T and is plotted in FIG. 1 as a function of hydrostatic pressure, the zero pressure measurement corresponding to the atmospheric pressure test as per the ASTM bulletin. Curve 11 shows that polystyrene, which has an "initial" extension-at-break (extension-at-break under atmospheric pressure) less than 5 percent shows a decrease in ductility as the hydrostatic pressure applied to the sample increases. This behavior has been discovered to be characteristic of such stiff materials. Such materials may be highly crystalline and show crystalline fracture; they may be amorphous materials at a temperature below the brittle point for that material; or they may be bodies with mixed crystalline and amorphous regions in which the amorphous regions are below the brittle point. It is believed that these materials are generally characterized by small intermolecular spacing so that large intermolecular forces prevent the displacement of one molecular chain with respect to its neighbor and that the decrease in ductility of these materials with increasing pressure is probably due to the further reduction of this intermolecular spacing with the consequent increase in intermolecular forces.

Curve 12 shows the behavior of a sample of tetrafluoroethylene which is highly ductile at atmospheric pressure. This curve 12 illustrates the fact that, for these materials also, the ductility decreases with increasing hydrostatic pressure. Such materials are believed to characteristically have large intermolecular spacings and consequently relatively weak intermolecular forces. This facilitates the relative displacement of neighboring molecular chains and the extension of the bulk material under tensile stress. The decrease in ductility of these materials with increasing hydrostatic pressure would then also be due to decreased intermolecular spacing.

The major discovery here is the behavior, with hydrostatic pressure, of polymeric bodies exhibiting intermediate ductility at atmospheric pressure. It has been found, as illustrated by curve 13 and Table 1 that materials falling generally within the range of 5 percent to 150 percent initial extension-at-break, when tested at atmospheric pressure, exhibit a ductility peak greater than 20 percent when tested under hydrostatic pressure. This peak lies, typically, within the hydrostatic pressure range of 5,000 to 15,000 pounds per square inch.

These pressures are not limits and some polymeric bodies may possess ductility peaks at pressure as low as 1500 or as high as 20,000 pounds per square inch. Also due to the wide variety of material production practices and formulations, including the use of softening agents known in the art, there may be a small number of anomalous materials which defy classification in this way.

For any applicable material, the position and size of the ductility peak is temperature sensitive and sensitive to strain rate. For purposes of convenience and comparison the data disclosed here was all taken at standard room temperature and standard strain rates (ASTM Bulletin D638–67T). Materials which fall outside of the disclosed ductility range at room temperature may fall within this ductility range at some other convenient operating temperature and thus exhibit the peaking phenomenon at that temperature.

Materials falling within this intermediate atmospheric pressure ductility range can generally be characterized as possessing a mixture of amorphous and crystalline regions or a mixture of amorphous regions of varying stiffness and by the fact that, at the temperature at which the experiment is performed, at least some of the amorphous regions are above their brittle point. When a tensile stress is applied to such a material the soft regions surrounding the stiff region allow some general extension of the body until stress concentrations form at some of the stiff regions. Stiff regions at which there is a stress concentration will eventually crack. The surrounding amorphous regions prevent these cracks from propagating until, due to further extension and crack, the disruption of the material is so great that general failure occurs. It is felt that this failure mode is prevented by the application of hydrostatic pressure. The peaking effect is thought to be caused by two competing processes. One one hand increasing hydrostatic pressure tends to prevent the formation of stress cracks while on the other hand increasing hydrostatic pressure tends to make the soft regions stiffer. The first effect controls on the low pressure side of the peaks while the second effect controls on the high pressure side. In the pressure region of interest the bulk of the material is not under a net positive tensile stress but is under a compressive stress, since the hydrostatic pressure more than compensates for the applied tensile stress. Failure is prevented until much larger extensions are reached and whitening is suppressed. The absence of a net positive tensile stress suppresses the whitening even of those polymers which do not exhibit a ductility peak. The experiments illustrated in FIG. 1 were performed at room temperature. However, the general considerations above would be the same if translated to any other operating temperature and any tests meant to determine which polymers possess a ductility peak should be performed at the temperature desired for the forming operation.

Table 1 shows the results of measurements performed on an exemplary group of polymers all exhibiting a ductility peak. These materials can be separated into three major groupings. The first group of materials are homopolymers which are the product of the polymerization of one monomer. These may be chemically pure or formulated with small amounts of other materials. In any

TABLE 1

| | | Ultimate strain at— | | | |
| --- | --- | --- | --- | --- | --- |
| | Polymer type | Atmospheric pressure, percent | Maximum ductility, percent | Ductility increase, percent | Hydrostatic pressure at maximum ductility |
| Acetal copolymer | Co | 21 | 124 | 500 | 8,000 |
| Acetal homopolymer | Homo | 12 | 30 | 150 | 7,000 |
| High impact polypropylene | Co | 60 | 205 | 240 | 5,000 |
| Polyphenylene oxide | Homo | 13 | 36 | 175 | 10,000 |
| Acrylonitrile-butadiene-styrene | Blend | 20 | 49 | 145 | 1,500 |
| Cellulose acetate butyrate | Co | 12 | 25 | 108 | 15,000 |
| Rubber modified polystyrene | Blend | 50 | 70 | 40 | 5,000 | event the conditions of their production are thought to lead to the formation of a mixture of crystalline and amorphous regions. The second group of materials can, for the purposes of this disclosure, be called heteropolymers. These are the polymeric product of more than one variety of monomer (these are called copolymers if there are two major constituents, terpolymers if there are three major constituents, et cetera). In these materials, the differences in the chemical constituents lead to the formulation of a mixture of regions of varying ductility. The third group are the polymers blends which are formed by the intimate physical mixing of different homopolymers and/or heteropolymers. Table 1 is, merely, an exemplary showing of the discovered behavior of a number of samples of particular formulations of some commercially important materials and does not represent a complete listing of materials which would benefit by the application of hydrostatic pressure during cold forming operations.

The above discovery of an increase in ductility by as large a factor as 5 in some polymeric materials makes possible cold forming operations which would be otherwise difficult or impossible due to the whitening and failure of the materials. The term cold forming here envisions operation at room temperature or any other convenient operating temperature without the necessity of expensive heating and cooling cycles.

Figure 2:
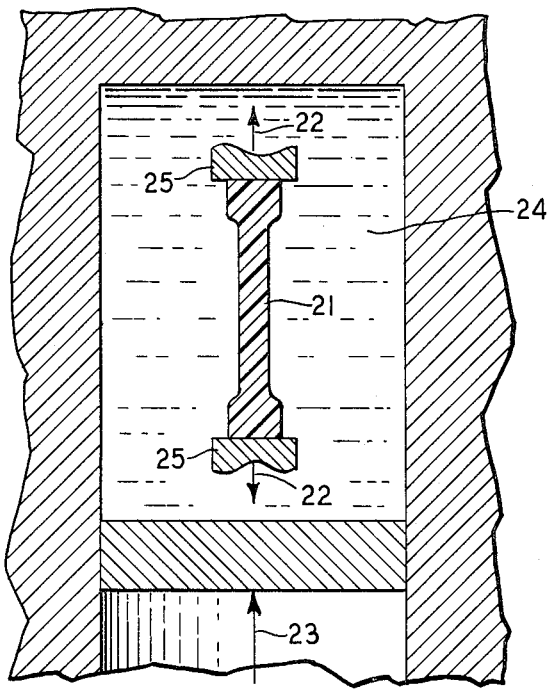
FIG. 2 is an elevational view in section of an exemplary apparatus for cold forming a polymer body while the body is subject to hydrostatic pressure.

In FIG. 2 cold forming while under hydrostatic pressure is exemplified by a simple extension of the sample 21 produced by the separation of the gripping jaws 25. This operation is merely exemplary of the many embossing, drawing and other cold forming operations known in the art which can advantageously be performed under a superposed hydrostatic pressure as in accordance with the above teaching. The jaws 25 are exemplary of the many known tools used in the art to apply to the polymer body the tensile forces necessary to produce the desired deformation.

What is claimed is:

1. Method for the fabrication of an article comprising deforming a body by means of forces including extensional forces, which said body is composed essentially of a polymeric material exhibiting between five percent and 150 percent elongation-at-break when tested at the temperature of fabrication and atmospheric pressure characterized in that said forces include a hydrostatic pressure, which said hydrostatic pressure
   (a) is maintained on at least the portion of the surface of said body in the region of deformation of said body during said deformation,
   (b) is superposed upon said extensional forces,
   (c) is within the range of 1500 pounds per square inch to 20,000 pounds per square inch,
   (d) is such as to maintain the region of said deformation under a net compressive stress, and
   (e) is such as to produce a greater than 20 percent increase in said elongation-at-break while said region of deformation is subject to said hydrostatic pressure, said forces resulting in deformation greater than said elongation-at-break observed at atmospheric pressure.

2. Method of claim 1 in which said elongation-at-break lies between 10 percent and 100 percent.

3. Method of claim 1 in which said polymeric material is essentially a homopolymer and in which said body contains crystalline and amorphous regions.

4. Method of claim 3 in which said polymeric material is essentially a member of the group consisting of polypropylene, acetal homopolymer and polyphenylene oxide.

5. Method of claim 1 in which said polymeric material is essentially a copolymer and in which said body contains regions of varying ductility.

6. Method of claim 5 in which said polymeric material is essentially a member of the group consisting of acetal copolymer, high impact polypropylene and cellulose acetate butyrate.

7. Method of claim 1 in which said polymeric material is essentially a blend of polymers of varying ductility.

8. A method of claim 7 in which said polymeric material is essentially a member of the group consisting of acrylonitrile-butadiene-styrene and rubber modified polystyrene.

9. Method of claim 1 in which said temperature of fabrication is room temperature.

References Cited

UNITED STATES PATENTS

| | | | |
|---|---|---|---|
| 3,532,786 | 10/1970 | Coffman | 264—320 X |
| 3,470,291 | 9/1969 | Johnson | 264—292 |
| 3,507,941 | 4/1970 | Kies et al. | 264—88 |
| 3,439,078 | 4/1969 | Whiteford | 264—88 |
| 3,171,350 | 3/1965 | Metcalf et al. | 264—320 X |

OTHER REFERENCES

Knox, J. R.: Def. pub. search copy of Ser. No. 713,769, published in 856 O.G. 697 on Dec. 17, 1968, Def. Pub. No. T857,034, 264—84 X.

ROBERT F. WHITE, Primary Examiner

J. H. SILBAUGH, Assistant Examiner

U.S. Cl. X.R.

264—88, 320